Nov. 15, 1932.    W. A. HARRIS    1,887,681
WATERING TROUGH
Filed Dec. 2, 1930    2 Sheets-Sheet 2

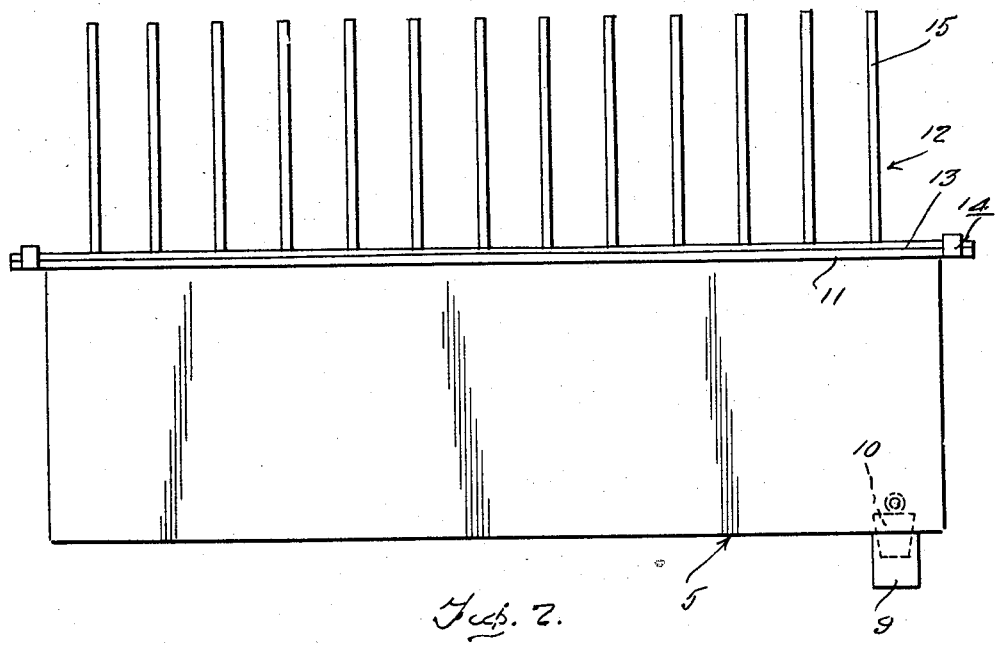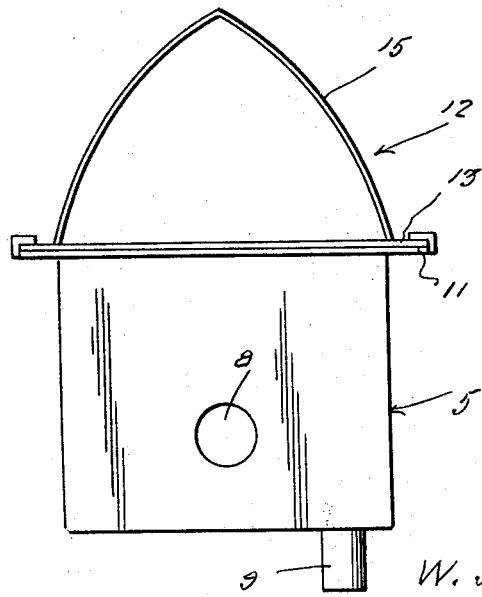

Inventor
W. A. Harris
By Clarence A. O'Brien
Attorney

Patented Nov. 15, 1932

1,887,681

UNITED STATES PATENT OFFICE

WALTER ASA HARRIS, OF WASHINGTON, PENNSYLVANIA

WATERING TROUGH

Application filed December 2, 1930. Serial No. 499,572.

This invention relates to an improved watering trough which is especially, but not necessarily, designed for supplying heated water for poultry.

As a general rule, watering troughs employed for this purpose utilize a trough or container for the water and separate heating means for warming the water as the water is slowly circulated in and out of the trough.

The purpose of the present invention is to provide a trough which does not employ the water circulating principle but rather provides a means for circulating heated air through the water in the trough for more effectively conditioning and warming and maintaining it at a constant temperature regardless of the level of the water in the trough.

In carrying the invention into practice I have evolved and produced a simple and economical structure for accomplishing this result in a highly satisfactory and dependable manner.

In the drawings:

Figure 1 is a side elevational view of a trough developed in accordance with the present invention.

Figure 2 is an end view thereof.

Figure 3:
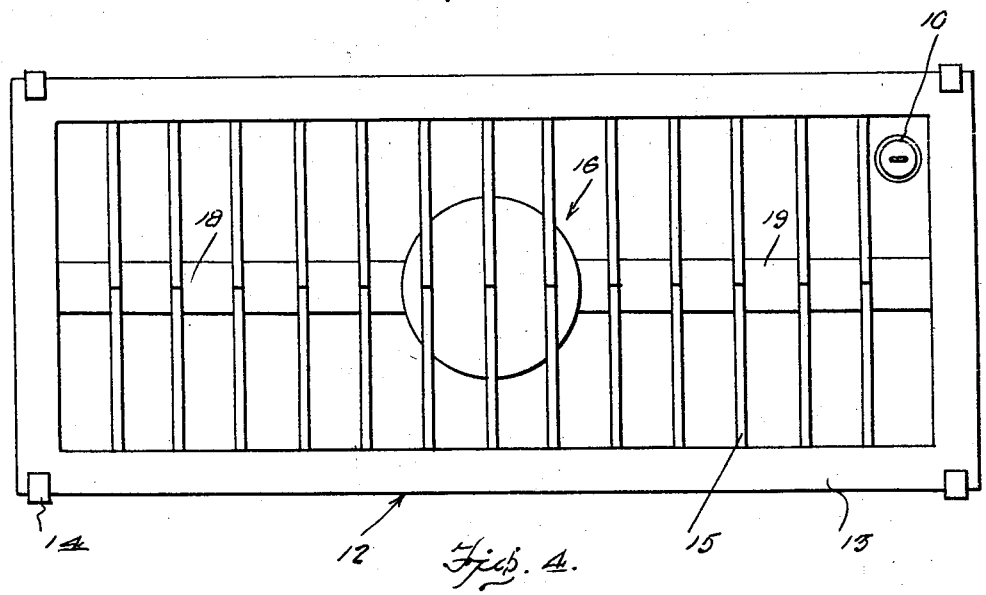
Figure 3 is a top plan view.
Figure 4:
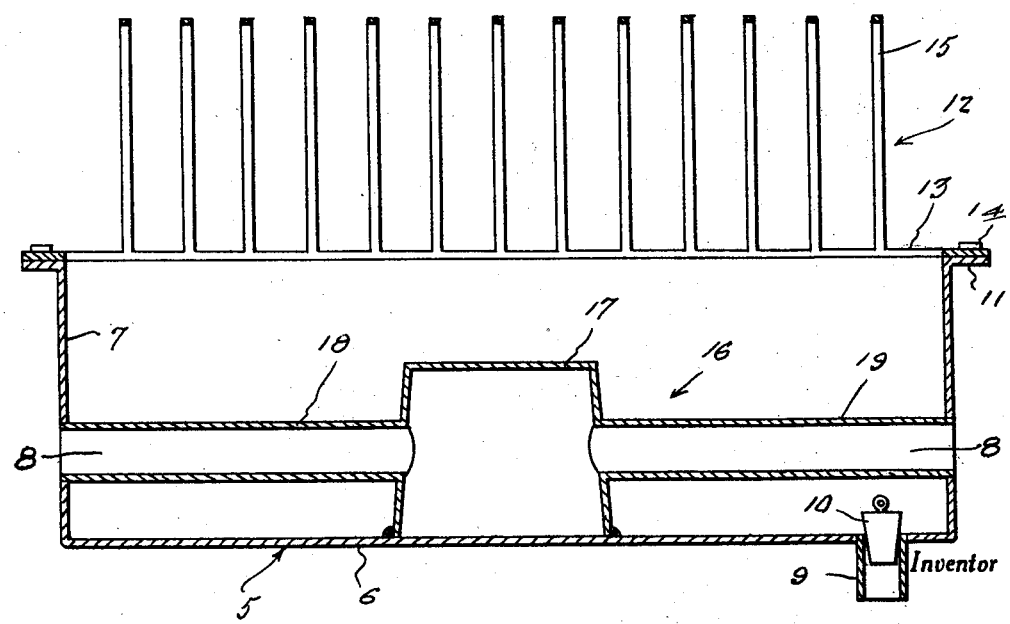
Figure 4 is a longitudinal sectional view.

In the drawings the trough is generally designated by the numeral 5. It is in the form such as rectangular and including a flat bottom 6 and marginal upstanding walls 7. The end walls of the trough are provided with air circulating holes 8 for the heated air. The bottom 6 is provided with a drain neck 9 adapted to receive a removable drain plug 10 to facilitate draining the trough. The upper edge of the walls is formed with an outstanding flange 11 which serves to accommodate a removable guard 12. The guard comprises an attaching base frame 13 which rests on the flange 11 and which is held removably in place by clips 14 carried by the flange 11. The guard includes substantially V-shaped arched members 15 designed to prevent small chicks from falling into the trough. The legs of the members 15 are slightly curved as shown in the drawings.

The numeral 16 designates a heated air distribution and circulation device which preferably comprises a dome 17 having diametrically oppositely extending branch pipes 18 and 19 whose outer ends are communicated through the holes 8 in the end walls of the trough. As seen in the drawings, the pipes 18 and 19 extend from the dome 17, which is centrally located on the bottom 6 of the trough, at points above halfway between the top and bottom of the dome.

The dome 17 functions as a heat concentrator. Heat is applied to the bottom of the trough preferably at the location of the dome 17. This, of course, not only partially heats the water in the trough but also heats the air in the dome 17. Reaching an effective temperature, the heated air circulates through the pipes 18 and 19 which are surrounded by water. In this way is provided a stationary heat distributing device within the trough which circulates heated air through the water therein for more effectively warming the water in the trough. This is believed to be a new principle of heating water in watering troughs for poultry and the like. It is obvious that as the level of the water in the trough is reduced through consumption by the chicks or stock or through evaporation, less heating thereof is required to maintain the desired temperature thereof. As the level of the water is thus reduced in the device of the invention, more and more of the dome 17 and of the pipes 18, 19 will be exposed to the air so that correspondingly less heat will be applied to the water. In this way, the parts being properly proportioned, a constant temperature of the water will be maintained regardless of its level in the trough.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

Having thus described my invention, what I claim as new is:

1. A heating device for a watering trough and the like, comprising a warm air circulator within the trough comprising an enlarged domelike hollow body secured upon the bottom thereof, and a plurality of relatively small air conducting tubes extending from the hollow body and in communication therewith at points intermediate the upper and lower ends of the hollow body, and extended through but not beyond the walls of the water trough, whereby upon applying heat to the bottom of the trough, preferably adjacent the location of said hollow body, warm air will be circulated through said tubes to heat water in the trough and the water will be additionally heated by conduction of the accompanying heated condition of the bottom of the trough, said body being formed and said tubes being attached thereto in the manner recited so as to provide that a substantially constant heating area will be in contact with the water in the trough according to its level therein.

2. A heating device for a watering trough and the like, comprising a warm air circulator within the trough comprising an enlarged domelike hollow body secured upon the bottom thereof, and a plurality of relatively small air conducting tubes extending from the hollow body and in communication therewith from points about midway between the top and bottom of the body, and extended through but not beyond the walls of the water trough, whereby upon applying heat to the bottom of the trough, preferably adjacent the location of said hollow body, warm air will be circulated through said tubes to heat water in the trough and the water will be additionally heated by conduction of the accompanying heated condition of the bottom of the trough, said enlarged hollow body being generally frusto-conical in formation thereof, and said tubes being proportioned and secured to the body as recited whereby at different levels of the water in the trough, a substantially proportional heating area of the body and/or tubes will be contacted by the water whereby to maintain the water at an even temperature at all levels thereof.

In testimony whereof I affix my signature.

WALTER ASA HARRIS.